United States Patent [19]
Munz-Schaerer et al.

[11] Patent Number: 5,882,716
[45] Date of Patent: Mar. 16, 1999

[54] SOLUBLE COFFEE BEVERAGE PRODUCT

[75] Inventors: Daniela Doris Munz-Schaerer, Konolfingen; Olaf Wehrspann, Orbe; Marc Furrer, Blonay; Heinz Wyss, Oberdiessbach, all of Switzerland

[73] Assignee: Nestec S.A., Vevey, Switzerland

[21] Appl. No.: 815,977

[22] Filed: Mar. 10, 1997

[30] Foreign Application Priority Data

Mar. 12, 1996 [EP] European Pat. Off. ............. 96200676

[51] Int. Cl.⁶ ................................ A23L 2/40; A23F 5/00
[52] U.S. Cl. ......................... 426/591; 426/594; 426/580; 426/588; 426/569
[58] Field of Search .................................. 426/594, 569, 426/580, 588, 590, 591

[56] References Cited

U.S. PATENT DOCUMENTS

| | | | |
|---|---|---|---|
| 3,227,558 | 1/1966 | Richmond | 99/71 |
| 3,823,241 | 7/1974 | Patel et al. | 426/386 |
| 4,438,147 | 3/1984 | Hedrick, Jr. | 426/570 |
| 4,745,527 | 5/1988 | Belverio, Jr. et al. | 362/100 |
| 4,746,527 | 5/1988 | Kuypers | 426/594 |
| 5,030,473 | 7/1991 | Ghodsizadeh | 426/650 |
| 5,100,509 | 3/1992 | Pisecky et al. | 159/4.2 |
| 5,222,364 | 6/1993 | Carns et al. | 62/15 |
| 5,400,972 | 3/1995 | Maier et al. | 239/422 |
| 5,433,962 | 7/1995 | Stipp | 426/96 |

FOREIGN PATENT DOCUMENTS

| | | |
|---|---|---|
| 645566 | 1/1994 | Australia . |
| 0354810 | 2/1990 | European Pat. Off. . |
| 378498 | 7/1990 | European Pat. Off. . |
| 458310 | 11/1991 | European Pat. Off. . |
| 4407361 | 9/1995 | Germany . |

*Primary Examiner*—Anthony J. Weier
*Attorney, Agent, or Firm*—Pennie & Edmonds LLP

[57] ABSTRACT

A soluble coffee beverage powder which, upon the addition of water, is capable of forming a coffee beverage having a foamed upper surface. The soluble beverage powder is made up of a soluble whitener powder containing gas and a soluble coffee powder of delayed water solubility. Upon addition of water, the soluble whitener powder dissolves first and hence it is possible to obtain whiter, stable foams.

30 Claims, No Drawings

SOLUBLE COFFEE BEVERAGE PRODUCT

FIELD OF THE INVENTION

This invention relates to a soluble coffee beverage product which, upon addition of a liquid, forms a coffee beverage having a frothy, white foam on its surface. The invention especially relates to a soluble coffee beverage product which is of the instant "cappuccino" type.

BACKGROUND OF THE INVENTION

Soluble coffee beverage products of the instant "cappuccino" type are well known and are commercially available. Usually these products are a dry mix of a soluble coffee powder and a soluble whitener powder. The soluble whitener powder contains pockets of gas which, upon dissolution of the powder, produce foam. Therefore, upon the addition of water (usually hot), a whitened coffee beverage, which has a foam on its upper surface, is formed; the beverage resembling, to a greater or lesser extent, traditional Italian cappuccino.

Of the two main components of the soluble coffee beverage product, the soluble whitener powder has shown to be the most problematic. In order to produce an acceptable beverage, little or no lumps should form upon dissolution. Unfortunately, dairy proteins are susceptible to flocculation in the presence of raised temperatures and acidic conditions; both of which are present upon dissolution of the soluble beverage powder. However, flocculation is one of the causes of the formation of lumps. Further, to closely resemble a traditional Italian cappuccino, a white, stable foam should form on the surface of the beverage. However, quite often the foam produced by soluble "cappuccino" powders is not white; instead it has a brownish color.

A soluble whitener powder of excellent stability and ability to foam is described in U.S. Pat. No. 4,746,527. The soluble whitener powder described in this patent is made up of fats, lactic proteins, lactose and a stabilizer system. The ratio of lactic proteins to lactose must be in the range of 1:3.5 to 1:5 and the stabilizer system consists of a citrate salt and a phosphate salt. Carbohydrates other than lactose may also be present. To ensure foaming, the soluble whitener powder is subjected to gassing during spray drying so that the soluble whitener powder contains gas.

The soluble whitener powder described in this patent has been extremely successful commercially in that it produces an excellent, stable foam. However the foam produced may have a slight brownish color and consequently may not be as white as the foams of traditional Italian cappuccino.

Another soluble whitener powder intended for "cappuccino" products is described in European patent 0458310. The soluble whitener powder described in this patent is made up of dry skimmed milk solids, lactose, fats, caseinates and alkali phosphate. These components are mixed with water, pasteurized, homogenized, gassed with carbon dioxide or nitrogen and spray-dried. The powder is described to produce a good foam. It is also mentioned that, due to the use of skimmed milk concentrates, a whiter foam is produced. However, since hot water is added to a dry mix of the soluble coffee powder and the soluble whitener powder to form the beverage, some coffee solids will color the milk proteins forming the foam and give them a brown color. Consequently the beverage produced will have a brownish foam. Also flocculation of the dairy proteins and the formation of lumps may occur.

Therefore there is still a need for a soluble coffee beverage product which provides a stable, white foam upon a beverage formed by the addition of water.

SUMMARY OF THE INVENTION

According to one aspect, this invention provides a soluble coffee beverage powder which, upon the addition of water, is capable of forming a coffee beverage having a foamed upper surface, the soluble beverage powder comprising: a soluble whitener powder containing gas for foaming; and a soluble coffee powder of delayed water solubility.

It is surprisingly found that by using a soluble coffee powder which is of delayed solubility in water, a stable, white foam forms on the surface of the beverage upon addition of water. Further, it is surprisingly found that no or less stabiliser and added lactose is required in the soluble whitener powder; even if the soluble whitener powder contains milk proteins. This is a significant advantage since this enables the soluble whitener powder to be made from pure milk.

The soluble coffee beverage powder preferably contains the soluble coffee powder and soluble whitener powder in a mass ratio of about 10 to about 30 parts of the soluble coffee powder to about 90 to about 70 parts of soluble whitener powder. It is particularly preferred if the ratio is about 14 to about 20 parts of the soluble coffee powder to about 86 to about 80 parts of soluble whitener powder.

The solubility of the soluble coffee powder is preferably delayed for at least about 2 seconds; more preferably for at least about 5 seconds. For example, the soluble coffee powder may be delayed for about 5 to 10 seconds. Even more preferably, the solubility of the coffee powder is delayed such that the soluble whitener powder dissolves at least as quickly as the soluble coffee powder.

Preferably the soluble coffee powder comprises soluble coffee particles coated by a coating agent which reduces the water solubility of the soluble coffee particles. The coating agent is preferably a carbohydrate (for example sucrose, fructose, maltose, dextrose, maltodextrin, lactose, coffee solids, pectin, xanthan gum and starch), a protein (for example milk solids, or gelatine) or an edible fat (for example lecithin or edible vegetable fats such as coconut fat). Lactose or coffee solids are particularly preferred as coating agents.

In a particularly preferred embodiment, the soluble coffee particles are coated by spraying a concentrated coffee solution onto them while simultaneously drying them to provide a coating of coffee solids.

Preferably the soluble coffee solids dissolve in water at about 85° C. after about 2 seconds or more. In particular, it is preferred if the majority of the soluble coffee solids dissolve in about 5 seconds to about 10 seconds.

The soluble whitener powder is preferably produced from milk concentrate. The soluble whitener powder may comprise from about 60 to about 90% by weight of non-fat milk solids and about 10% to about 40% by weight of milk fat. More preferably, the soluble whitener powder comprises from about 75% to about 85% by weight of non-flat milk solids and about 15% to about 25% by weight of milk fat; for example about 80% to about 84% by weight of non-fat milk solids and about 16% to about 20% by weight of milk fat.

The soluble whitener powder may also include an aroma or flavor containing carrier substance, for example an edible fat. Preferred fats are, for example, milk fat, coffee oil or coconut fat. Preferably the carrier fat contains a coffee aroma. The carrier fat preferably comprises about 0.5% to about 2% by weight of the soluble whitener powder.

The invention also provides a soluble beverage powder comprising a soluble coffee powder and a soluble whitener powder containing a gas for foaming, the soluble coffee beverage powder, upon the addition of water, forming a coffee beverage having a foamed upper surface of whiteness degree above about 50 when measured from above the coffee beverage. Preferably the foamed upper surface has an average whiteness degree of at least 55; for example about 56.

The invention also provides a soluble beverage powder comprising a soluble coffee powder and a soluble whitener powder containing a gas for foaming, the soluble coffee beverage powder, upon the addition of water, forming a coffee beverage having a foamed upper surface of whiteness degree above about 70 when measured from within the foamed upper surface. Preferably the foamed upper surface has an average whiteness degree of at least 75; for example about 80 to about 85.

In this specification, the whiteness degree (WD) is expressed as $WD=100-((100-L)^2+(a^2+b^2))^{0.5}$ where L, a, and b are as defined in DIN 6174. Pure white has a whiteness degree of 100 and is based on a DIN 5033 reference.

In another aspect, this invention provides a process for the production of a soluble beverage powder, the process comprising mixing together a soluble coffee powder of delayed water solubility and a soluble whitener powder which contains gas for foaming.

Preferably the process further comprises the step of coating or granulating a soluble coffee powder with a coating agent to delay the water solubility of the soluble coffee powder.

The invention also relates to a soluble beverage powder obtainable from the process defined above.

DETAILED DESCRIPTION OF PREFERRED EMBODIMENTS OF THE INVENTION

Embodiments of the invention are now described, by way of example only.

The soluble coffee beverage powder is made up of a soluble whitener powder and a soluble coffee powder which is of delayed solubility in water. Usually, soluble coffee powder is very soluble in water while soluble whitener powders are less soluble in water since protein rehydration is slow and they contain fats. However, if significant amounts of soluble coffee powder dissolve prior to the soluble whitener powder, the medium in which the soluble whitener powder dissolves will be acidic and brown. This leads to lumping and a brown foam. Therefore, the water solubility of the soluble coffee powder must be reduced or delayed. If desired, it is also possible to increase the water solubility of the soluble whitener powder in addition to delaying the solubility of the soluble coffee powder.

To produce a soluble beverage powder of reduced water solubility, a suitable starting ingredient is conventional spray- or freeze-dried coffee powder. Such coffee powders are commercially available or may be produced by conventional extraction and drying techniques. If desired, the coffee powder may be in the form of an agglomerated powder produced, for example, using the procedure described in U.S. Pat. No. 5,400,972 (the disclosure of which is incorporated by reference). The starting coffee powder is then subjected to solubility reduction processes of which there are many. Consequently the soluble coffee powder having delayed or reduced solubility may be produced in many ways and may be provided in many different forms.

One convenient process is to coat or granulate the particles of the starting coffee powder using a coating agent which reduces solubility. In this case, the soluble coffee powder is provided in the form of particles or granules of soluble coffee each coated with a coating which reduces solubility in water. Coatings based upon carbohydrates, proteins and fats are particularly suitable. Examples of suitable carbohydrate coatings are sucrose coatings, fructose coatings, maltose coatings, dextrose coatings, lactose coatings, pectin coatings, coatings formed of coffee solids, starch based coatings, maltodextrin coatings, or xanthan gum coatings, or mixtures thereof. Examples of suitable protein coatings are caseinate coatings, milk solid coatings, and gelatins coatings. If a coating is used to reduce the solubility, it is particularly advantageous to use coffee solids as the coating since the soluble coffee powder then remains pure coffee.

The particles of soluble coffee may be coated using any suitable technique. For example, the soluble coffee particles may be coated in a fluidized bed drier, or may be coated during spray drying, or may be coated by co-extruding a coating about the soluble coffee particles.

If a fluidized drier is used, the soluble coffee particles are fed into the fluidized bed drier in which they are fluidized using a drying gas. Then a solution of the coating agent is sprayed over the fluidized particles to coat them. The drying gas dries the coating agent on the particles. This operation may be performed batchwise or continuously. Suitable fluidized bed dryers are freely available and examples may be obtained from Glatt AG, Niro Aeromatic AG, and the like.

The mass ratio of starting coffee powder to coffee solids fed into the fluidized bed drier may be selected to give the desired thickness of coating. If a highly soluble whitener powder is used in the soluble beverage powder, less coating on the soluble coffee particles is needed. The converse is true for poorly soluble whitener powder. However, for most applications, the coating makes up about 50% to about 75% by weight of the coated soluble coffee particles.

To avoid having to expend large amounts of energy drying the coated coffee powder, the coffee solids are conveniently fed into the fluidized drier as a concentrated extract; for example an extract having greater than 40% solids content. The extract may be formed by dissolving soluble coffee powder in water until the selected concentration is obtained or by suitably concentrating an extract obtained from a coffee extraction process. The drying gas used to fluidize the bed is conveniently air, dried air or nitrogen. The temperature of the drying gas is preferably within the range of about 50° C. to about 80° C.; for example about 60° C. to about 70° C. The coated coffee particles are conveniently retained in the fluidized bed drier and subjected to drying until the moisture content of the coated coffee particles is reduced to below about 6% by weight; for example about 4% to about 5.5% by weight moisture.

Coating of the soluble coffee particles in the spray drier may be accomplished by spraying a concentrated coffee extract into the spray drier near bottom of the spray drier. In this way, the soluble coffee particles leaving the spray drier will obtain a coating of coffee solids.

The soluble coffee particles also may be coated by melting the coating agent and co-extruding it with the soluble coffee powder in the form of a string of molten coating agent surrounding the soluble coffee. Suitable co-extrusion nozzles which enable the molten coating agent to be co-extruded about the soluble coffee are freely available. One suitable nozzle is described in U.S. Pat. No. 5,399,368. The co-extruded string is then permitted to cool and is comminuted to provide particles of soluble coffee coated by the coating agent. With this process, the coating may not be complete for every soluble coffee particle, but sufficient coating is applied to sufficient reduce the overall solubility of the soluble coffee powder. It will be appreciated that the molten coating agent may be produced from soluble coffee particles or a highly concentrated coffee extract (for example about 85% by weight coffee solids).

Another convenient process is to process the starting coffee powder into a coffee glass of reduced water solubility. In this case, the soluble coffee powder is provided in the form of particles of coffee glass. Many techniques for the production of coffee glass are known but it is most convenient to form the coffee glass using an extruder. Soluble coffee powder or a concentrated coffee extract is fed into an extruder and subjected to mechanical and thermal energy to form a coffee melt; usually at a temperature above about 80° C. The coffee melt is then forced through one or more orifices, permitted to cool to form a coffee glass, and then comminuted to form a powder. Gas may be introduced into the coffee melt in the extruder if it is so desired but care must be taken not to lower the density of the resultant coffee glass by too much. Otherwise the coffee glass will not sink in the water but instead will rise and become entrapped in the foam forming on the top of the beverage. A procedure for producing coffee glass is disclosed in European patent 0354810.

The solubility of the soluble coffee powder is usually delayed for at least about 2 seconds compared to conventional soluble coffee; although delays of about 5 to about 10 seconds are particularly suitable. Of course, much longer delays, such as up to about 1 minute, are perfectly acceptable but no additional advantage is obtained. Also, the consumer may be disinclined to stir the beverage for much longer than about 10 to about 20 seconds. Once a soluble coffee powder of reduced solubility is available, it must be mixed with a soluble whitener powder. Simply dry mixing of the powders is most convenient.

The soluble whitener powder may be any suitable whitener powder which contains gas and which is able to form a white, stable foam upon addition of water. For example, any of the soluble whitener powders described in U.S. Pat. No. 4,745,527 and 4,438,147 and European patent 0458310 (the disclosures of which are incorporated by reference) may be used. Other dairy creamers, non-dairy creamers, synthetic creamers and dairy imitation creamers may also be used.

Alternatively, a soluble whitener powder produced from milk concentrates, without the addition of lactose or stabilisers, may be used. Ordinarily, soluble whitener powders of this type cannot be used since they are prone to lumping and flocculation when dissolving in acidic liquids. However, since the soluble coffee powder (which acidifies the beverage) dissolves later than usual, the problem no longer arises or is at least greatly diminished. The ability to use soluble whitener powders produced from milk concentrates is an advantage since a creamier, dairy-like mouthfeel is obtained.

To produce a soluble whitener powder from milk concentrates, techniques well known in the milk powder industry may be used. For example, a standardized milk is first produced. This may be done by combining skimmed milk, whole milk, cream, etc in selected proportions to obtain a milk of desired fat and solids content. The standardized milk is then heat treated; for example at about 105° C. for about 5 minutes. Then the standardized milk is concentrated by evaporation; usually to a total solids concentration of about 40 to about 60% by weight. If desired, the concentrated milk may be homogenized.

The concentrated milk is then gassed by injecting a gas such as air, nitrogen or carbon dioxide into it; for example at a pressure of about 100 to 400 kPa above the pressure of the concentrated milk. The gassed milk is then pumped to the spray nozzle of a spray drier, usually at a pressure of about 2.5 MPa to about 8 MPa, and sprayed. Hot air at a temperature of about 200° C. to about 400° C. is then used to dry the milk droplets. If desired, a device (such as a screen) may be placed over the hot air inlet to break up the incoming hot air stream into many secondary streams. This offers the advantage of reducing bursting of the droplets of concentrated milk.

If desired, a carrier substance such as a fat may be mixed into the concentrated milk prior to gassing. The fat may be any suitable edible fat, animal or vegetable, but coconut fat and coffee oil are found to be particularly suitable. Apart from raising the fat content of the concentrated milk, it is particularly advantageous to use the fat as a vehicle for the addition of desired aromas or flavors; for example coffee, vanilla, almond, chocolate, whisky, brandy, Irish creme, and the like. Of course, if these aromas or flavors are in powdered form, they may be directly mixed in with the soluble beverage powder at a later stage.

It is particularly advantageous to incorporate coffee aroma into coconut fat or coffee oil and add it to the concentrated milk. In this way, the consumer perceives coffee aroma even before the soluble beverage powder is dissolved. Also a stronger coffee flavor and aroma may be obtained per unit of soluble coffee powder when the soluble coffee beverage powder is dissolved in water. This permits the amount of soluble coffee powder used in the beverage to be reduced; resulting in further whitening of the foam while maintaining an acceptable coffee flavor and aroma.

The coffee aroma used may be any suitable coffee aroma; natural or synthetic. However natural aromas collected during the preparation of soluble coffee powder are preferred. Procedures for collecting the aromas are well known. Usually they entail flushing the volatile aromas from the coffee during processing using an inert carrier gas such as nitrogen. The aroma-laden carrier gas is then chilled to temperatures lower than −40° C., and sometimes as low as −195° C., to cause the aromas to condense. The condensed aromas are then collected. The condensed aromas are then usually absorbed into a suitable carrier such as coffee oil or coconut oil or suitable emulsions (for example coffee oil-coffee extract emulsions). Alternatively, the aromas may be absorbed into the carrier during condensation. Suitable procedures for carrying out the condensation and absorption steps are disclosed in, for example, U.S. Pat. Nos. 3,823,241, 5,030,473, and 5,222,364 (the disclosures of which are incorporated by reference).

It will be appreciated that the aromas or flavors may be added to the soluble coffee powder in addition to, or in replacement of, the aromas or flavors included in the soluble whitener powder. Further, if other soluble whitener powders are used, the aromas or flavors may be incorporated into them in a similar fashion. The levels of the aromas or flavors used may be selected as desired but usually the soluble beverage powder may contain from about 0.05% to about 10% by weight of aromas or flavor.

Because the soluble coffee powder dissolves after the soluble whitener powder, it is not necessary to include stabilizers and additional lactose in the soluble whitener powder. A soluble whitener powder made from milk concentrates as described above will be sufficiently stable under most conditions without added lactose or stabilizers.

However, if desired, stabilizers or additional lactose may be included. As stabilizers, phosphate and citrate salts are particularly suitable; for example $Na_2HPO_4$ and $Na_3(C_6H_5O_7).2H_2O$. The amount of stabilizer used may be in the range of about 0.1% to about 5% by weight of the soluble coffee beverage powder.

The soluble coffee beverage powder may also include a soluble sweetener; natural or artificial. Suitable examples include sucrose, fructose, lactose, maltose, saccharin, cyclamates, acetosulfame, L-aspartyl based sweeteners such as aspartame, and the like, and mixtures of these. The amount of the sweetener used will vary depending upon the desired level of sweetness and the strength of the sweetener. However for sugar based sweeteners, the total amount of sweeteners is usually in the range of about 10% to about 25% by weight. The soluble sweetener may also be combined with bulking agents such as maltodextrins and polydextrose; particularly if an artificial sweetener is used. In this case, the total amount of sweetener and bulking agent is usually in the range of about 10% to about 25% by weight; artificial sweetener itself usually comprising less than 1% by weight.

EXAMPLE 1

A soluble whitener powder is produced from a standardized milk containing 238.7 kg of non-fat milk solids and 51.2 kg of lactic fat. The standardized milk is preheated to 85° C. in a plate heat exchanger and then heated to 105° C. for 5 seconds by injection of steam. The heated milk is then concentrated to a solids content of about 48 to about 50% by weight. The concentrated milk is cooled to about 40° C. and allowed to remain at this temperature for about 10 minutes.

Coffee aroma obtained from a cryogenic aroma recovery unit is mixed into coconut fat and the fat heated to about 50° C. to melt it. The concentrated milk is heated to 75° C. in a plate heat exchanger and the molten coconut fat mixed into the concentrated milk. The aromatized concentrated milk is then transferred to a spray drying tower at a rate of 580 liters/hour. Nitrogen is injected into the aromatized concentrated milk prior to the spray drying tower at a rate of about 7 liters/minute at a pressure of about 3 bar. The gassed concentrate is then pumped at a pressure of 7 MPa to the nozzle of the spray-drying tower.

In the spray drying tower, the concentrated milk is dried by spraying with air at 335° C. under a pressure of 15.7 kPa on entry. The primary air stream is broken up into small secondary turbulent streams under a pressure of about 7.9 kPa by a screen placed at the concentrate nozzle.

About 300 kg of soluble whitener powder is produced. The composition of the powder is:

| Component | % by weight |
| --- | --- |
| lactic fat | 17.3 |
| coconut fat | 1.4 |
| Proteins | 29.8 |
| Lactose | 42.6 |
| Minerals | 6.4 |
| Moisture | 2.5 |

EXAMPLE 2

Two kg of soluble coffee powder is placed into an Aeromatic fluidized bed drier obtained from Niro Aeromatic AG. Warm air at a temperature of about 46° C. and a flow rate of about 45 to about 90 m³/hour is circulated through the drier to fluidize the soluble coffee powder and preheat it.

After about 5 minutes, a concentrated coffee extract containing 46.5% by weight coffee solids is sprayed into the drier at a flow rate of 1 14 g/minute. The spraying is continued for 39 minutes. The warm air is then allowed to circulate through the drier for another 20 minutes to dry the powder.

About 3.5 kg of coated coffee powder at 5.6% by weight moisture is obtained.

EXAMPLE 3

A soluble beverage powder is prepared by mixing together about 18% by weight of the coated coffee powder of example 2 and 82% by weight of the soluble whitener powder of example 1. About 12 g of the powder is placed in a beaker and 150 ml of water at 85° C. is added with stirring.

The resulting beverage has a stable white foam upon a brown liquid. No lumping is observed and the foam has no brown shades to it. The beverage has a good coffee flavor and a creamy mouthfeel.

EXAMPLE 4

About 0.6 kg of soluble coffee powder is placed in Glatt CPGC1 fluidized bed drier obtained from Glatt AG. Warm air at a temperature of about 48° C. and at an inlet velocity of about 6.0 to 7.5 m/s is circulated through the drier to fluidize the soluble coffee powder and preheat it.

After about 10 minutes, a concentrated coffee extract containing 50% by weight coffee solids is sprayed into the drier at a flow rate of 31 g/minute. The spraying is continued for 55 minutes. The warm air is then allowed to circulate through the drier for another 22 minutes to dry the powder.

About 2 kg of coated coffee powder at 4.75% by weight moisture is obtained.

EXAMPLE 5

A soluble beverage powder is prepared by mixing together about 18% by weight of the coated coffee powder of example 4 and 82% by weight of the soluble whitener powder of example 1. About 12 g of the powder is placed in a beaker and 150 ml of water at 85° C. is added under stirring.

The resulting beverage has a stable white foam upon a brown liquid. No lumping is observed and the foam has no brown shades to it. The beverage has a good coffee flavor and a creamy mouthfeel.

EXAMPLE 6

Soluble beverage powders which are commercially available from Kraft Jacobs-Suchard GmbH, Kraft General Foods (Maxwell House brand), LavAzza S.p.A, Die Weissen, Grandos Qualitas GmbH, Eduscho GmbH and Tchibo GmbH (Picco brand) are purchased. A sample of 12 g of each of these commercially available powders and a sample of 12 g of the powder of example 5 are separately placed in beakers. About 150 ml of water at 85° C. is added to each beaker and the beverages are stirred for 30 seconds at 400 rpm using a magnetic stirrer.

About 60 seconds thereafter, the color of the foam above each beverage is determined by taking a reading using a Micro Color sensor (obtained from Dr. Bruno Lange AG, Hegnau 8604, Switzerland) positioned directly above the foam. The sensor is operated in accordance with manufacturer's instructions and the color expressed as a whiteness degree in terms of the L/a/b system of DIN 6174. A pure white surface in accordance with DIN 5033 is used as reference. The procedure is repeated four times for each beverage. In each case, an amount of the foam is transferred to a sample cuvette and the color or whiteness degree measured again.

The average whiteness degree of the foams is as follows:

| Sample | Foam Whiteness (measured from above the beverage) | Foam Whiteness (measured in cuvette) |
| --- | --- | --- |
| Jacobs | 43 | 45 |
| Maxwell | 35 | 46 |
| LavAzza | 32 | 46 |
| Die Weissen | 33 | 46 |
| Grandos | 32.5 | 47 |
| Eduscho | 36 | 46 |
| Picco | 31 | 46 |
| Example 5 | 56 | 62 |

A value of 100 indicates pure white. The results indicate that the soluble beverage powder of example 5 produces a foam which is significantly whiter than the foams produced by conventional soluble beverage powders.

A sample of 12 g of the soluble whitener powder of example 1 is placed in a beaker. About 150 ml of water at 85° C. is added to the beaker and the beverage is stirred for 30 seconds at 400 rpm using a magnetic stirrer. After about 60 seconds, the color of the foam above the beverage is determined as described above. The foam has a whiteness degree of 100.

EXAMPLE 7

Soluble beverage powders which are commercially available from Kraft Jacobs-Suchard GmbH, Kraft General Foods (Maxwell House brand), Lavazza S.p.A, Eduscho GmbH and Tchibo GmbH, Krüger, Arcus B.V., Migro, ASDA and Tesco are purchased. A sample of each of these commercially available powders is separately placed in a beaker in accordance with the manufacturer's instructions. Also a sample of 12 g of the powder of example 5 is separately placed in a beaker. About 150 ml of water at 85° C. is added to each beaker and the beverages are stirred about 5 times using a teaspoon.

About 60 seconds thereafter, the color of the foam is determined by taking a reading using a Minolta Chromameter CR 200 positioned in the foam. The sensor is operated in accordance with manufacturer's instructions and the color expressed as a whiteness degree in terms of the L/a/b system of DIN 6174. A pure white surface in accordance with DIN 5033 is used as reference. The procedure is repeated three times for each beverage.

The average whiteness degree of the foams is as follows:

| Sample | Foam Whiteness (measured in the foam) |
| --- | --- |
| Jacobs | 54.4 |
| Maxwell | 47.8 |
| Lavazza | 56.8 |
| Kruger | 54.7 |
| Arcus B. V. | 56.4 |
| Eduscho | 58.3 |
| Tschibo | 59.0 |
| Migro | 63.4 |
| ASDA | 57.2 |
| Tesco | 59.7 |
| Example 5 | 82.5 |

The results indicate that the soluble beverage powder of example 5 produces a foam which is significantly whiter than the foams produced by conventional soluble beverage powders.

What is claimed is:

1. A soluble coffee beverage powder which, upon addition of water, is capable of forming a coffee beverage having a foamed upper surface, the soluble beverage powder comprising: a soluble whitener powder containing gas for foaming; and a soluble coffee powder of delayed solubility in water wherein the solubility of the coffee powder is delayed such that the whitener powder dissolves at least as quickly as the coffee powder to provide a coffee beverage having a foamed upper surface of whiteness degree above 50 when measured from above the coffee beverage.

2. A soluble beverage powder according to claim 1 in which the solubility of the soluble coffee powder is delayed for at least about 2 seconds.

3. A soluble beverage powder according to claim 2 in which the solubility of the soluble coffee powder is delayed for at least about 5 seconds.

4. A soluble beverage powder according to claim 1 in which the soluble coffee powder dissolves in water at about 85° C. in about 5 to about 10 seconds.

5. A soluble beverage powder according to claim 1 in which the soluble coffee powder comprises soluble coffee particles coated by a coating agent which reduces the water solubility of the soluble coffee particles.

6. A soluble beverage powder according to claim 5 in which the coating agent is soluble coffee solids.

7. A soluble beverage powder according to claim 1 which provides a coffee beverage having a foamed upper surface of whiteness degree above 70 when measured in the foamed upper surface.

8. A soluble beverage powder according to claim 1 in which the soluble coffee powder provides about 10% to 30% by weight of the soluble beverage powder.

9. A soluble beverage powder according to claim 1 in which the soluble whitener powder comprises about 60 to about 90% by weight of non-fat milk solids and about 10% to 40% by weight of milk fat.

10. A soluble beverage powder according to claim 1 in which the soluble whitener powder contains a carrier substance carrying coffee aroma.

11. A soluble beverage powder comprising a soluble coffee powder and a soluble whitener powder containing a gas for foaming, the soluble coffee beverage powder, upon the addition of water, wherein the solubility of the coffee powder is delayed such that the whitener powder dissolves at least as quickly as the coffee powder to form a coffee beverage having a foamed upper surface of whiteness degree above 50 when measured from above the coffee beverage.

12. A soluble beverage powder according to claim 11 in which the soluble coffee powder comprises soluble coffee particles coated by a coating agent which reduces the water solubility of the soluble coffee particles.

13. A soluble beverage powder according to claim 12 in which the coating agent is soluble coffee solids.

14. A soluble beverage powder according to claim 11 in which the soluble coffee powder provides about 10% to 30% by weight of the soluble beverage powder.

15. A soluble beverage powder according to claim 11 in which the soluble whitener powder comprises about 60 to about 90% by weight of non-fat milk solids and about 10% to 40% by weight of milk fat.

16. A soluble beverage powder according to claim 11 in which the soluble whitener powder contains a carrier substance carrying coffee aroma.

17. A soluble beverage powder comprising a soluble coffee powder and a soluble whitener powder containing a gas for foaming the soluble coffee beverage powder, upon the addition of water wherein the solubility of the coffee powder is delayed such that the whitener powder dissolves at least as quickly as the coffee powder to form a coffee beverage having a foamed upper surface of whiteness degree above 70 when measured in the foamed upper surface.

18. A soluble beverage powder according to claim 17 in which the soluble coffee powder comprises soluble coffee particles coated by a coating agent which reduces the water solubility of the soluble coffee particles.

19. A soluble beverage powder according to claim 18 in which the coating agent is soluble coffee solids.

20. A soluble beverage powder according to claim 17 in which the soluble coffee powder provides about 10% to 30% by weight of the soluble beverage powder.

21. A soluble beverage powder according to claim 17 in which the soluble whitener powder comprises about 60 to 90% by weight of non-fat milk solids and about 10% to 40% by weight of milk fat.

22. A soluble beverage powder according to claim 17 in which the soluble whitener powder contains a carrier substance carrying coffee aroma.

23. A soluble coffee beverage powder which, upon addition of water, is capable of forming a coffee beverage having a foamed upper surface, the soluble beverage powder comprising:
   a soluble whitener powder containing gas for foaming and a carrier substance carrying coffee aroma; and
   a soluble coffee powder of delayed solubility in water wherein the solubility of the coffee powder is delayed such that the whitener powder dissolves at least as quickly as the coffee powder to provide a coffee beverage having a foamed upper surface of whiteness degree above 50 when measured from above the coffee beverage.

24. A soluble beverage powder according to claim 23 in which the solubility of the soluble coffee powder is delayed for at least about 2 seconds.

25. A soluble beverage powder according to claim 23 which the soluble coffee powder dissolves in water at about 85° C. in about 5 to about 10 seconds.

26. A soluble beverage powder according to claim 23 in which the soluble coffee powder comprises soluble coffee particles coated by a coating agent which reduces the water solubility of the soluble coffee particles.

27. A soluble beverage powder according to claim 26 in which the coating agent is soluble coffee solids.

28. A soluble beverage powder according to claim 23 which provides a coffee beverage having a foamed upper surface of whiteness degree above 70 when measured in the foamed upper surface.

29. A soluble beverage powder according to claim 23 in which the soluble coffee powder provides about 10% to 30% by weight of the soluble beverage powder.

30. A soluble beverage powder according to claim 23 in which the soluble whitener powder comprises about 60 to 90% by weight of non-fat milk solids and about 10% to 40% by weight of milk fat.

\* \* \* \* \*